Dec. 23, 1958      E. L. CLARKE      2,865,657
TRACTOR AND IMPLEMENT HITCH
Filed May 29, 1950      4 Sheets-Sheet 1
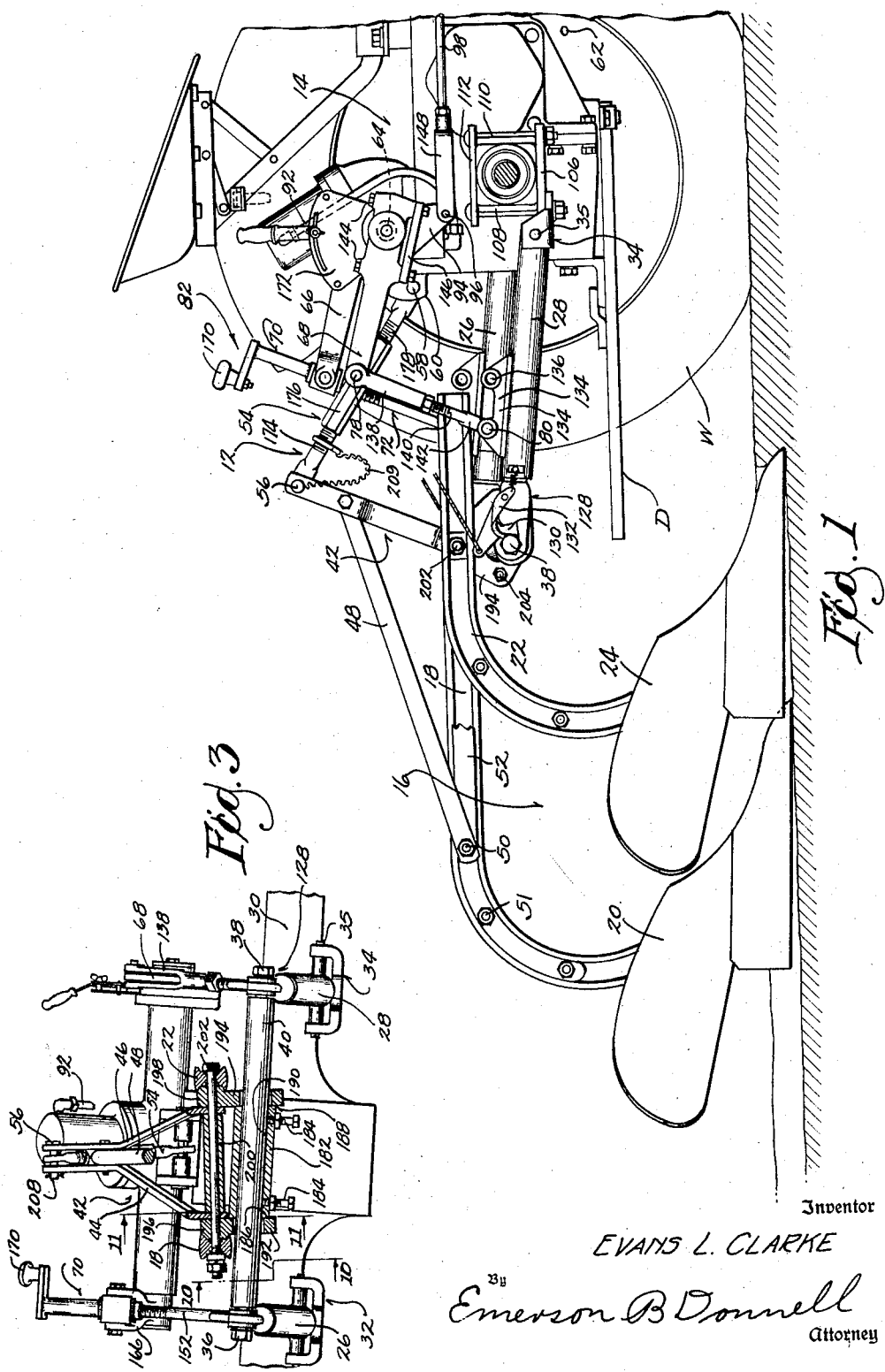
Inventor
EVANS L. CLARKE
By Emerson B Donnell
Attorney

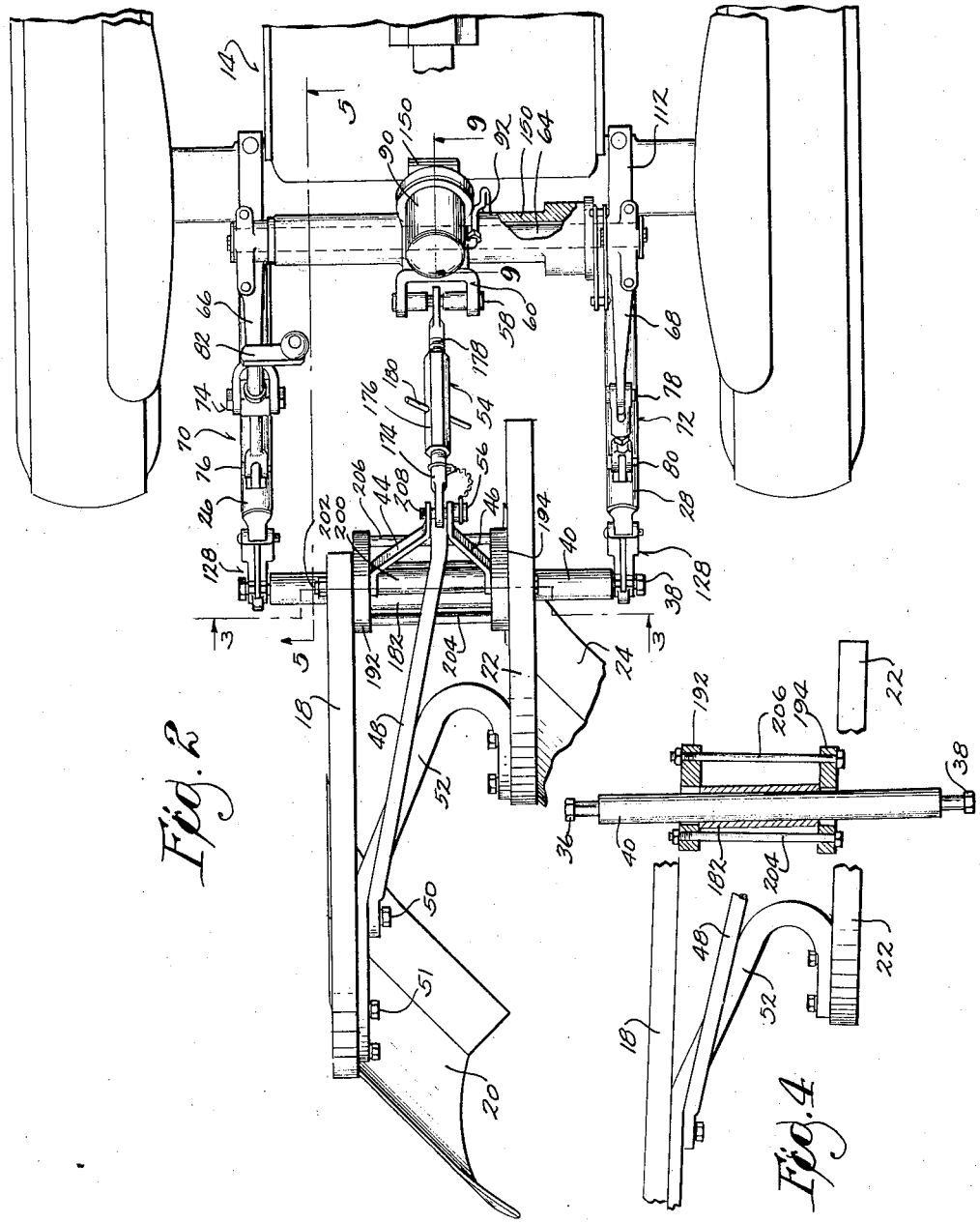

Dec. 23, 1958  E. L. CLARKE  2,865,657
TRACTOR AND IMPLEMENT HITCH
Filed May 29, 1950  4 Sheets-Sheet 3
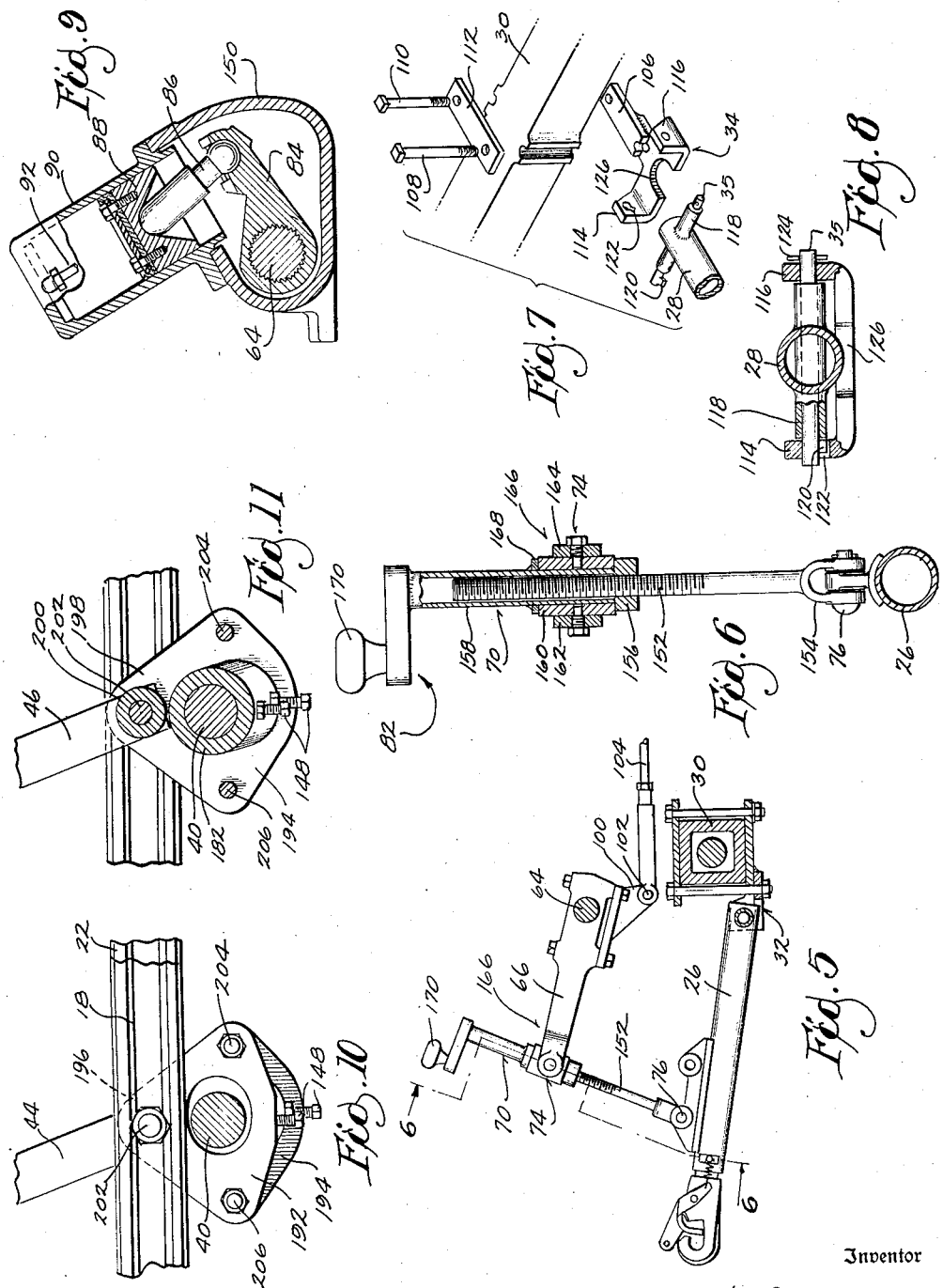
Inventor
EVANS L. CLARKE
By Emerson B Donnell
Attorney Dec. 23, 1958　　　　E. L. CLARKE　　　　2,865,657
TRACTOR AND IMPLEMENT HITCH
Filed May 29, 1950　　　　　　　　　　　　4 Sheets-Sheet 4

Inventor
EVANS L. CLARKE
BY Emerson B. Donnell
Attorney

United States Patent Office 2,865,657
Patented Dec. 23, 1958

2,865,657

TRACTOR AND IMPLEMENT HITCH

Evans L. Clarke, Milan, Ill., assignor to J. I. Case Company, Racine, Wis., a corporation of Wisconsin Application May 29, 1950, Serial No. 165,066

4 Claims. (Cl. 280—460)

The present invention relates to hitches for mounting soil working implements on tractors and an object of the invention is to generally improve the construction and operation of devices of this class.

For some time it has been common to mount various agricultural implements such for example as plows, cultivators, planters and the like on the tractors which are to propel them and numerous expedients have been devised for effecting such connection. Usually the connection includes some means for lifting the implement or implements into an inoperative position and various difficulties have arisen in coordinating all of the necessary parts into the most advantageous relation. The implement which is mounted usually requires guiding and at the same time a certain degree of freedom and accordingly a further object of the invention is to provide to a certain extent guiding of the attached implement without interfering with such freedom or floating action as is necessary and customary in the particular type of implement mount.

Mounted implements have also been characterized by a great number of connections to the tractor and the operation of applying them to the tractor or removing them so that the tractor can be used for other purposes, or so that other implements can be mounted instead, has turned out to be a laborious and time-consuming undertaking. A further object of the invention is to provide a connection by the use of which many implements can be mounted, dismounted or replaced with others substantially instantly, or in a matter of a few seconds.

A further object is to provide a hitch or linkage which will accomplish the above objects and which is characterized by the possibility of readily changing the relations of the parts sufficiently to adapt it to varying conditions and characteristics of implements which may be attached.

Further objects are to provide ready and easily manufactured mechanical expedients for effecting the above.

Further objects and advantages will become apparent from the following specification and accompanying drawings in which:

Figure 1 is a right side elevation of so much of a tractor as necessary to illustrate the invention, a plow being mounted on the tractor as an example of an attached implement.

Fig. 2 is a plan view of the mechanism shown in Fig. 1.

Fig. 3 is a vertical sectional view taken substantially on the line 3—3 of Fig. 2.

Fig. 4 is a plan view of a portion of Fig. 2 showing certain parts in a different adjusted position.

Fig. 5 is a right side elevation, partly in section on the line 5—5 of Fig. 2.

Fig. 6 is an enlarged rear elevation of certain mechanism indicated in Fig. 5 partly in section on the line 6—6 of Fig. 5.

Fig. 7 is an "exploded" perspective view of certain mechanism indicated in Figs. 1 and 2.

Fig. 8 is an enlarged rear elevation of the structure indicated in Fig. 7, with the parts assembled.

Fig. 9 is a vertical sectional view of a hydraulic actuating cylinder taken on the line 9—9 of Fig. 2.

Fig. 10 is an enlarged vertical sectional view taken substantially on the line 10—10 of Fig. 3.

Fig. 11 is a similar view taken substantially on the line 11—11 of Fig. 3.

Figures 12, 13:
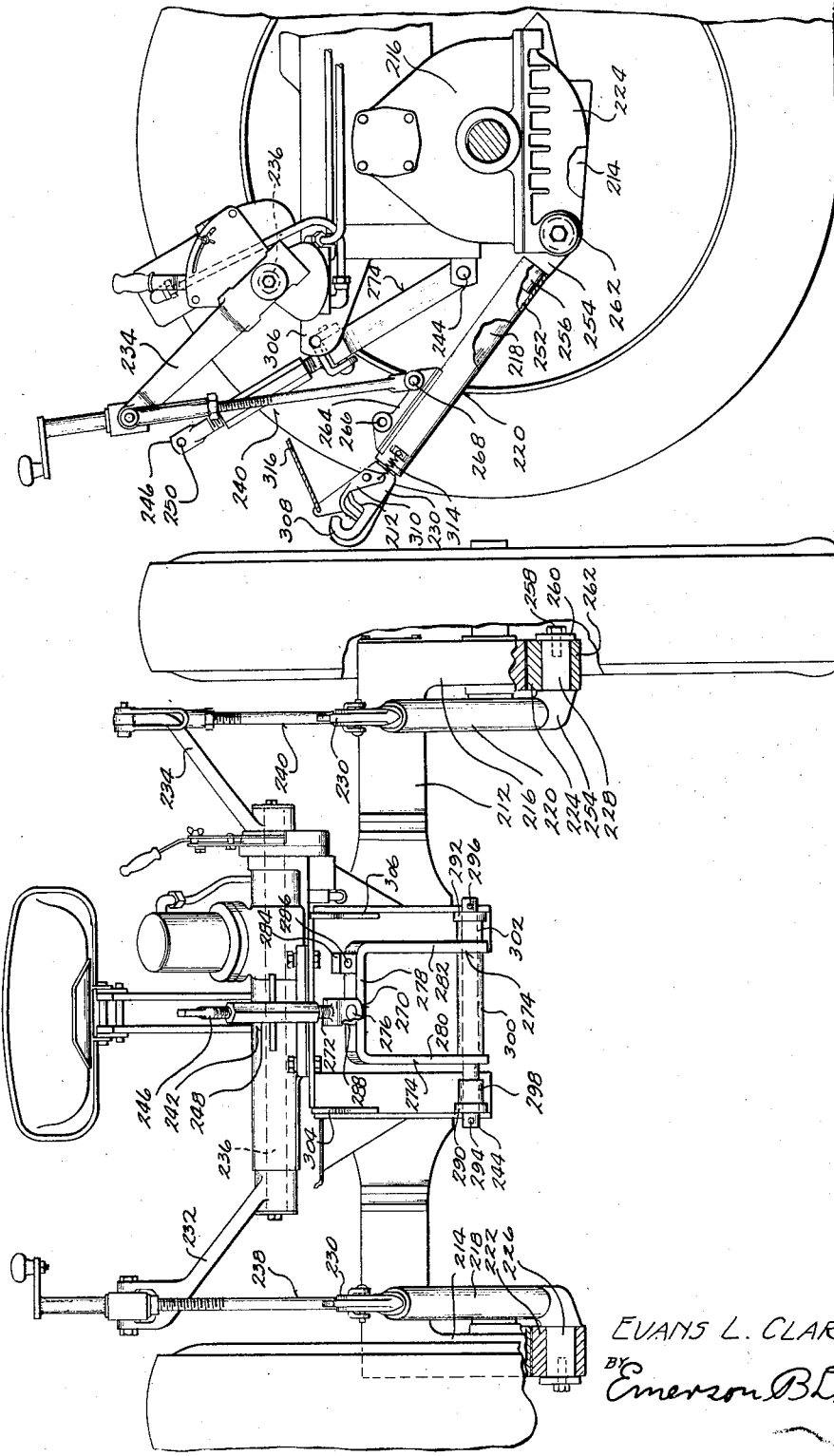
Fig. 12 is a rear elevation, with parts broken away, of a modified form of the device, especially adapted to use with a slightly different form of tractor.
Fig. 13 is a vertical sectional view of the same taken on the line 13—13 of Fig. 12, and with parts broken away.

As seen in Fig. 1, the hitch assemblage is generally designated as 12 and is fastened between a tractor generally designated as 14 having a traction wheel W and a drawbar D and an implement generally designated as 16 which may be of any desired or appropriate type but which, in order to illustrate certain peculiar advantages of the hitch, in the present instance comprises a moldboard type of plow having a beam 18 and a bottom 20, a second beam 22 drawing and supporting a second bottom as 24 in well-known manner. Such an implement, as is well-understood, is somewhat critical in its operation in that the angle of application of the draft force, line of draft, attitude or position, angularly of the plow in relation to the direction of progress, and angle or tilt with relation to the tractor, must be and must remain correct if the full possible efficiency of the plow is to be realized as regards effective action on the soil, minimum power requirements, wear, etc. At the same time, it is a distinct advantage to be able to couple the implement closely behind the tractor. In the present instance, a linkage has been devised in which these advantages can be realized and which does couple the implement in closely spaced relation to the tractor.

In this instance, a pair of spaced draft members 26 and 28 are pivoted to the tractor axle 30 on brackets 32 and 34 by means of pivots 33 and 35 respectively and extend rearwardly and are pivoted at 36 and 38 to a crossmember 40 of implement 16. The pulling force is exerted through these draft members. Beams 18 and 22 are secured to cross-member 40 as will be fully described but as will be apparent, the assemblage so far described would be unstable for plowing purposes, beams 18 and 22 being subject to a couple tending to force clockwise rotation of the implement as seen in Fig. 1, about crossmember 40 on pivots 36 and 38, and having also a downward force which would tend to swing draft members 26 and 28 downwardly about their pivots 33 and 34. To counteract this effect, a mast generally designated as 42 is fixed in relation to cross-member 40 and, in the normal working position of the parts extends upwardly and is preferably forwardly inclined as related to the direction of progress of the implement. Mast 42 in the present instance comprises side sections 44 and 46, Fig. 3, fastened respectively adjacent beam 18 and beam 22 and inclined toward each other to form a roughly A shaped unit. Mast 42 has a brace 48 extending from the upper portion thereof downwardly and rearwardly and fastened at its rear extremity to beam 18 in any suitable manner as by a bolt 50. A brace 52 preferably unites beams 18 and 22 in any suitable or well-known manner as by bolts 51—51, the beams, braces just referred to, and mast 42 together forming a rigid assemblage. The tendency toward clockwise rotation of the implement about cross-member 40, as will be apparent, would cause generally forward movement of the apex or upper extremity of the A frame or mast 42 constituted by members 44 and 46. This is resisted by an upper link generally designated as 54 pivoted at 56 to mast 42 and at 58 to a bracket 60 fastened to tractor 14.

Pivot point 58 in the present instance is spaced upwardly and rearwardly as related to the direction of travel, from pivots 33 and 35, whereas pivot point 56 is spaced upwardly and forwardly in relation to pivot points 36 and 38. Furthermore, the spacing of pivot point 56 above pivots 36 and 38 is substantially greater than the spacing of pivot point 58 above pivot points 33 and 35.

A linkage of the type described, as is well-understood, will produce an effect on the implement 16 similar, insofar as up and down floating movement is concerned, to a single rigid draw bar or plow beam extending to a point 62 in the vicinity of the intersection of the extended plane of members 26 and 28 with the extension of link 54. Applicant has discovered that a point 62 slightly ahead of and beneath axle 30 is definitely of advantage as will be further explained presently.

It will be further noted that, except for the stability given by brackets 32 and 34 and pivots 56 and 58, the implement would not be stabilized as regards side to side tilting or rolling movement relatively to tractor 14, it being understood that normal and unavoidable working clearances in pivots 33, 35, 36, 38, 56 and 58, together with normal flexibility or resiliency of the various parts would permit appreciable undesired rolling movement of implement 16. For this reason, a stabilizing bar 64 is journaled on tractor 14 at a point upwardly and forwardly of pivot 58 and preferably although not necessarily rearwardly of axle 30, and has rearwardly directed arms 66 and 68 connected respectively with draft members 26 and 28 by means of links generally designated as 70 and 72, link 70 being pivoted to arm 66 at a point 74 and to draft member 26 at a point 76 while link 72 is pivoted to arm 68 at a point 78 and to arm 28 at a point 80. Since bar 64 and arms 66 and 68 are substantially rigid with each other, draft members 26 and 28 will be constrained to similar up and down movement about pivots 33 and 35. Lateral tilting of implement 16 is therefore prevented since one of the draft members 26 and 28 cannot go up or down to any appreciable extent without the other. Furthermore, as will be apparent, by adjusting the length of one of the links, as 70, by means of a crank 82 as will be fully described, the relation of draft members 26 and 28 may be changed and will remain approximately as so changed throughout the various possible up and down positions of said draft members 26 and 28. As will be apparent, such adjustment will cause tilting movement of implement 16 relative to tractor 14 and such adjustment is therefore available for "tilting" the implement, in the present instance a plow, or "leveling" the plow in relation to the ground while the tractor runs in a tilted position as is normal in plowing operation.

Stabilizer bar 64 has an arm 84, Fig. 9, against which bears a piston rod 86 urged by a piston 88 in a cylinder 90 whenever pressure fluid is introduced into the cylinder through a conduit 92 in any suitable manner forming no part of the present invention. Such pressure fluid will urge piston 88 in a direction to rock arm 84 and bar 64 in a clockwise direction as seen in Fig. 1 whereupon a lifting effect will be exerted through links 70 and 72 on draft members 26 and 28 and implement 16 will be raised clear of the ground. Bar 64, therefore, serves a dual purpose in that it is part of a power lift normally on the tractor and also in that it is a stabilizing means for draft members 26 and 28 and implement 16.

Arm 68 has a lift rod actuating arm 94 pivoted as by a pin 96 to a lift rod 98 which runs forwardly along the right side of the tractor and actuates any desired front mounted implements in a manner forming no part of the present invention and not necessary to further describe. A similar lift rod actuating arm 100, Fig. 5, is attached to arm 66 and actuates, through a pivot pin 102, a lift rod 104 which extends forwardly along the left side of the tractor for a purpose similar to rod 98.

Returning to a more detailed description of the mechanism, brackets 32 and 34 being substantially identical only one will be described, bracket 34 for example comprising a bottom plate 106, Fig. 7, clamped by means of bolts 108 and 110 engaging a top plate 112, rigidly against above mentioned axle 30. Plate 106 has a rearwardly extending portion in the present instance comprising a separate piece suitably fixed, as by welding, to bottom plate 106 and providing upwardly directed ears 114 and 116. Above mentioned pivot 35 comprises a pin traversing suitable bores in ears 114 and 116, and about which is journaled a bearing sleeve 118 fixed transversely of draft member 28 for example by welding. Sleeve 118 substantially fills the space between ears 114 and 116 and pin 35 has a lug 120, Fig. 8, which projects into a slot 122 in ear 114 so as to prevent rotation of pin 35. Lug 120 also prevents axial displacement of pin 35 to the right as seen in aforesaid Fig. 8 by contact with the end of sleeve 118. Sleeve 118 cannot be displaced to the right because of ear 116. Pin 35 is secured against displacement to the left as by means of a cotter 124 which would engage the outer or righthand surface of ear 116. Lower plate extension 106 is preferably cut away at 126 beneath draft member 28 to avoid contact therewith upon extreme downward inclination of member 28.

Member 28 is preferably tubular in form and has at its left end as seen in Fig. 1 a hitching device generally designated as 128 which forms no part of the present invention but which provides a slotted opening 130 in which may be received above mentioned pivot 38. A keeper 132 is maintained in opening 130 in position to prevent displacement of pivot 38.

Between the ends thereof draft member 28 has a plate 134 for attachment of above mentioned link 72 and providing spaced openings as 136 for reception of above mentioned pivot 80. As will be apparent pivot pin 80 can be installed in a plurality of positions at different distances from pivot 35 and which will give leverage for application of the lifting force of arm 68 to suit different conditions such for example as implements of different weight or implements requiring a larger range of lifting movement, it being apparent that given a predetermined range of movement of arm 68, a greater movement of draft member 28 will result if link 72 is installed in opening 136 nearer to pivot 35 than would result if link 72 were installed as shown. On the other hand, assuming a predetermined maximum lifting force available in arm 68, a greater weight can be lifted on draft member 28 if link 72 is installed as shown than would be possible if link 72 were installed in opening 136 nearer to pivot 35.

Like 72 comprises an upper bifurcated portion 138, Fig. 3, into which is threaded a shaft 140, also connected with a bifurcated portion 142, Fig. 1. Pivot 78 connects portion 138 with arm 68 whereas pivot 80 connects portion 142 with plate 134. Initial adjustment, compensation for wear or the like may be effected by running shaft 140 into portion 138 as far as desired for the necessary length.

Arm 68 is rigidly fixed with shaft 64 in any suitable manner and has bolts 144—144 engaging a flange 146 forming a part of above mentioned actuating arm 94. Lift rod 98 is preferably threaded into a bifurcated portion 148 which is connected to arm 94 by means of above mentioned pivot 96. As will be apparent, when power lifting of implements at the front of the tractor is not required, arm 94 and rod 98 may be readily removed by taking out bolts 144—144 so that the unwanted parts will not encumber the tractor. They may be as readily replaced when again needed. Above mentioned shaft 64 is journaled in a housing portion 150 mounted transversely on the tractor above axle 30.

As best seen in Fig. 6, link 70 preferably comprises a threaded shaft 152 having a bifurcated lower portion 154 engaged with above mentioned pivot pin 76, shaft 152 engaging a nut element 156 fixed, for example as by welding, with a tubular portion 158. Tubular portion 158 is journaled in a block 160 which in turn is received between portions 162 and 164 of a bifurcated end of arm 66 generally designated as 166. Portion 158 has a collar 168 engaging block 160 and by reason of which tube 158 is restrained against axial movement relatively to block 160 in one direction. Nut 156 by engagement with block 160 secures the tube against axial movement in the other direction. Rotation of tube 158 will accordingly cause lengthening or shortening of the distance between pivot 76 and pivot 74. Pivot 74 comprises a pair of studs, in the present instance threaded into portions 162 and 164 and journaled in suitable openings in block 160. Above mentioned crank 82 is fixed on the upper extremity of tube 158 and has a suitable knob or handle 170 by which it may be readily turned by an operator on tractor 14. As will be apparent, turning of crank 170 will lengthen or shorten link 70 without affecting link 72. Thus draft member 26 will be raised or lowered independently of draft member 28, altering the angular position of cross-member 40 relatively to tractor 14, there being enough freedom in the various pivots to permit the necessary slight misalignment.

A quadrant 172 is preferably fixed to shaft 64 so as to rock therewith and forms part of a control mechanism which need not be further described since it forms no part of the present invention.

Link 54 comprises an apertured and threaded eye portion 174 engaged with a threaded sleeve portion 176 which is in turn engaged with an apertured and threaded eye portion 178, the threads on portions 174 and 178 being of different or opposite pitch so that rotation of sleeve portion 176 while eye portions 174 and 178 are restrained from rotation will expand or contract the assemblage. Portion 174 is engaged with pivot 56 and portion 178 is engaged with pivot 58. One or more handles as 180 project from sleeve 174 so that it is a simple matter to rotate sleeve 176 and thereby adjust the length of link 54.

As hereinbefore stated, the hitch arrangement so far described is adaptable to connecting a variety of different implements at the three points 36, 38 and 56, the plow 16 being chosen for illustration since it is one of the more critical implements as regards adjustment. Continuing with a more detailed description of the plow, cross-member 40 has a sleeve 182, Figs. 2, 3, 10 and 11, slidably fixed thereon as by set screws 184—184 and by means of which sleeve the plow is located and adjusted on cross-member 40. Sleeve 182 has its end faces 186 and 188 preferably parallel to each other but oblique to the bore 190 of sleeve 182 which bore is preferably, although not necessarily, co-axial with the exterior of sleeve 182. A ring-like fitting 192 is clamped into engagement with end surface 186 and a similar fitting 194 is clamped into engagement with end surface 188, fitting 192 having a relatively short boss 196 engaged with above mentioned beam 18 and fitting 194 having a relatively long boss 198 engaged with beam 22. Bosses 196 and 198 are spaced apart by a spreader 200, above mentioned member 44 of mast 42 being interposed between boss 196 and spreader 200 while member 46 is interposed between spreader 200 and boss 198. A bolt 202 extends through beam 18, boss 196, member 44, spreader 200, member 46, boss 198 and beam 22 and clamps the whole together into a substantially rigid structure. Members 194 and 192 having clamping bolts 204 and 206 which, when tightened clamp ring members 192 and 194 solidly against sleeve 182. It will be apparent, that with bolts 204 and 206 loosened, it will be possible to rotate cross-member 40 and therewith sleeve 182, the oblique relation of end portions 186 and 188 causing a slight fore and aft shifting of fittings 192 and 194 in opposite directions relatively to each other. As indicated in Fig. 4, this will cause slight angling of the plow either to the right or left in relation to the tractor, which adjustment can be used to minimize or eliminate side draft and also for causing the plow to take more or less land as desired.

Other implements providing attaching points corresponding substantially to pivot points 36, 38 and 56 may be substantially instantly substituted for plow 16 and will be completely under the control of the tractor and the power lift represented by rockshaft 64 and arms 66 and 68.

Pin 56 is preferably a plain, cylindrical, headed pin which may be readily slipped into place in mast 42 and eye portion 174, any suitable retaining means such as a cotter 208 preventing displacement. A retaining chain 209 is preferably connected between pivot pin 56 and some convenient part of the assemblage such as eye portion 174 so that pin 56 cannot be lost when removed from eye portion 174 for example for changing implements.

When plow 16 is to be disconnected, it is lowered to the ground, pin 56 is removed and retained by chain 209, and latches 128 are retracted whereupon draft members 26 and 28 are further lowered by the action of arms 66 and 68 whereupon the tractor may be driven away. When connecting another plow or other implement, the tractor is backed into position with draft members 26 and 28 in a lowered position. These members are then raised so as to engage the hitch points 36 and 38 or the equivalent on the other implement, link 54 is placed in position and pin 56 inserted. Draft members 26 and 28 are then raised by the action of arms 66 and 68 thus lifting the plow or implement clear of the ground. The tractor is then driven to the point of operation and the implement lowered by proper action of arms 66 and 68 either to allow the plow to float or, if depth control is necessary, to lower the implement to its proper depth and maintain it there.

When operating a plow the length of link 54 will control the angle of the plow and accordingly the depth which it will seek and maintain. This is easily controlled by lengthening or shortening the link 54 by means of the handles 180.

A slightly modified installation is shown in Figs. 12 and 13. In this case the tractor 210 has a rear axle 212 having drop housings 214 and 216 containing reduction gears not shown and not necessary to describe for an understanding of the invention. Draft arms 218 and 220 are pivoted respectively to lower closure or oil pan portions 222 and 224 of housings 214 and 216 at pivot points 226 and 228. As in the case of the hereinbefore described embodiment draft members 218 and 220 have latch members 230—230 preferably identical with above mentioned latch members 128 and for a similar purpose. Members 218 and 220 are controlled in a manner similar to the previously described embodiment by means of arms 232 and 234 secured at the extremities of a rockshaft 236, arms 232 and 234 being connected with their respective draft members 218 and 220 by means of links 238 and 240 identical in construction with above mentioned links 70 and 72 except for an increase in length to compensate for the increased distance between rockshaft 236 and members 218 and 220 as compared with the previously described embodiment.

A link 242 is pivoted to the tractor at 244 and has an eye portion 246 which is extensible by turning a sleeve portion 248 in a manner similar to above mentioned link 54. Eye portion 246 has a bore 250 by means of which it may be coupled to an implement in a manner similar to that previously described. The operation of this embodiment is substantially the same as that of the previously described embodiment, the proportions being sufficiently altered to work properly with the modified style of tractor.

Returning to a somewhat more detailed description of the modified arrangement, draft arm 220 is substantially identical with draft arm 218 and only one need be described. Referring to arm 220 the same comprises a tube 252 with rear end of which above mentioned latch 230 is secured in any suitable manner. At its forward end tube 252 has a fitting 254 preferably having a shank portion 256 suitably secured in the tube portion by welding or the like, fitting 254 comprising a substantially right angle bend preferably integral with above mentioned pivot 228. A cap screw or the like 258 in the present instance secures a cap or washer 260 against the outer end of pivot 228 so as to prevent inadvertent axial movement of pivot 228 and thus to retain it is position in a bearing portion 262 of above mentioned oil pan 224. Portion 220 has a plate 264 providing spaced bores as 266 for optional reception of a pivot pin 268 for connecting above mentioned link 240 to draft arm 220. As in the case of the previously described embodiment link 240 may be connected at either the forward or the rearward bore so as to result in the particular lifting force and distance characteristics desired. Link 240, being identical with above mentioned link 72 except for length, need not be further described.

Above mentioned link 242 unlike above mentioned link 54 has a bifurcated or clevis portion 270 having a threaded shank 272 engaged with sleeve 248. Clevis portion 270 is pivoted for swinging movement laterally of the tractor on a yoke 274 by means of a pivot pin 276. Yoke 274 is composed of a head portion 278 and leg portions 280 and 282 which normally extend downwardly and forwardly into connection with above mentioned pivot 244. Head portion 278 is provided with a block 284 having a bore 286 for optional reception of pivot pin 276, a similar block 288 being spaced from block 284 on head portion 278. As the parts are assembled from time to time for various implements, pin 276 may be engaged with block 284 if it is desired to offset link 248. Also yoke 274 may be reversed in position to place block 284 on the left side of the center of the tractor so that link 248 may be offset to the left. In this way a variety of positions of link 248, as required by varying types of implements, may be readily obtained.

Above mentioned pivot 244 is carried in brackets 290 and 292 and restrained against undesired axial movement by pins 294 and 296. Spacers 298, 300 and 302 are placed on pivot pin 244 to restrain yoke 274 against movement axially of pin 244. Predetermined freedom for such axial movement is provided by a space as illustrated between spacer 298 and leg portion 280. If such movement is not desired, this space may be closed by another spacer or by suitably dimensioning spacer 298 or 302. It will be apparent that by assembling the several spacers, pin 276 and blocks 284 and 288 that a great variety of positions, laterally of the tractor may be obtained for link 248.

Further variation in the position of link 242 may be accomplished by installing pivot pin 244 in a pair of brackets 304 and 306 which will place pin 244 substantially higher on the tractor and further to the rear. The same possibilities for lateral adjustment exist as in the case of brackets 290 and 292, and yoke 274 may be omitted and portion 270 placed directly on pin 244 if desired, to obtain any necessary reduction in overall length of link 242.

Latch 230 comprises a hook-like portion 308 having a keeper 310 hinged thereto and retained in a slot 312 by a spring 314, a rope or the like 316 extending to a convenient point on the tractor so that keeper 310 may be pulled out of slot 312 to release a pivot 318 corresponding to above mentioned pivot 38.

The operation of the two embodiments is similar and is thought to be clear from the foregoing description.

Sufficient to say, a typical implement is drawn through the substantially parallel draft elements 26 and 28 and is stabilized by link 54. Side to side rocking is prevented by arms 66 and 68 connected by links 70 and 72 with draft elements 26 and 28 by reason of the connection of arms 66 and 68 with each other through rockshaft 64. Lifting and lowering of the assemblage is accomplished by rocking shaft 64 by means of hydraulic piston 88 acting against arm 84. If the implement does not run level, or at the desired inclination relatively to the tractor, this may be corrected by adjusting link 70 by means of crank 170. Front implements may be controlled through arms 100 and 94 respectively attached to arms 66 and 68 and connected with the front of the tractor by means of lift rods 104 and 98.

The above being a complete description of an illustrative embodiment of the invention, what is claimed as new and desired to be secured by Letters Patent of the United States is:

1. In a hitch for a tractor mounted implement, said implement having spaced apart lower hitch points and a single hitch point in an elevated position relatively to said spaced apart hitch points, the combination with the tractor of a pair of laterally spaced lower links of predetermined width pivoted to the tractor at laterally spaced bearings, at least one of said bearings constituting a sleeve of a length substantially in excess of the width of its respective link fixed transversely on said link, a bifurcated bracket fixed on the tractor and embracing the ends of said sleeve and a pin extending through the sleeve and bracket, whereby to provide for pivotal movement of its respective link substantially exclusively in a single surface of revolution having an axis common to said bearing.

2. In a hitch for a tractor mounted implement, said implement having spaced apart lower hitch points and a single hitch point in an elevated position relatively to said spaced apart hitch points, the combination with the tractor of a pair of laterally spaced lower links of predetermined width pivoted to the tractor at laterally spaced bearings, at least one of said bearings constituting a sleeve of a length substantially in excess of the width of its respective link fixed transversely on said link, a bifurcated bracket fixed on the tractor and embracing the ends of said sleeve, a bore in said bracket having a keyway, a pin extending through said sleeve and bracket and having a lug engaged in said keyway and prevented from moving axially in one direction by abutting one end of said sleeve, and means for preventing axial displacement of said pin in the other direction.

3. In a hitch for a tractor mounted implement, said implement having spaced apart lower hitch points and a single hitch point in an elevated position relatively to said spaced apart hitch points, the combination with the tractor of a pair of laterally spaced lower links of predetermined width pivoted to the tractor at laterally spaced bearings, at least one of said bearings constituting a sleeve of a length substantially in excess of the width of its respective link fixed transversely on said link, a bifurcated bracket fixed on the tractor and embracing the ends of said sleeve, a bore in said bracket having a keyway, a pin extending through said sleeve and bracket and having a lug engaged in said keyway and abutting one end of said sleeve and being maintained thereby against axial displacement in one direction, and means on said pin at the end remote from said lug for preventing axial displacement of said pin in the opposite direction.

4. In a hitch for a tractor mounted implement, said implement having spaced apart lower hitch points and a single hitch point in an elevated postion relatively to said spaced apart hitch points, the combination with the tractor of a pair of laterally spaced tubular lower links of predetermined width pivoted to the tractor at laterally spaced bearings, at least one of said bearings including a sleeve of a length substantially in excess of the width of its respective link and fixed transversely of said link, a bifurcated bracket fixed on the tractor and having ears projecting in spaced relation to each other a distance substantially corresponding to the length of said sleeve, said ears being so disposed as to engage the ends of said sleeve when said sleeve is inserted between said ears, and a pin extending through the sleeve and bracket, whereby to provide for pivotal movement of its respective link substantially exclusively in a single surface of revolution having an axis common to said bearing.

References Cited in the file of this patent

UNITED STATES PATENTS

| Number | Name | Date |
|---|---|---|
| 1,363,477 | Lowe | Dec. 28, 1920 |
| 1,899,555 | Campbell | Feb. 28, 1933 |
| 2,309,750 | Carrington | Feb. 2, 1943 |
| 2,320,968 | Geraldson | June 1, 1943 |
| 2,335,510 | Hansen | Nov. 30, 1943 |
| 2,363,749 | Rude | Nov. 28, 1944 |
| 2,453,390 | Werner | Nov. 9, 1948 |
| 2,462,588 | Wondra | Feb. 22, 1949 |
| 2,487,955 | Todd | Nov. 15, 1949 |
| 2,561,650 | Carlson | July 24, 1951 |
| 2,575,801 | Evans | Nov. 20, 1951 |
| 2,580,109 | Love | Dec. 25, 1951 |